(12) United States Patent
Kim et al.

(10) Patent No.: US 8,400,640 B2
(45) Date of Patent: Mar. 19, 2013

(54) OPTICAL SENSOR INTERROGATION SYSTEM BASED ON FDML WAVELENGTH SWEPT LASER

(75) Inventors: Chang-Seok Kim, Nam-gu (KR); Myung-Yung Jeong, Geumjeong-gu (KR); Jae-Seok Park, Gimhae-si (KR); Eun-Joo Jung, Gochang-gun (KR); Hyung-Seok Lee, Saha-gu (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 659 days.

(21) Appl. No.: 12/566,403

(22) Filed: Sep. 24, 2009

(65) Prior Publication Data

US 2010/0103426 A1    Apr. 29, 2010

(30) Foreign Application Priority Data

Oct. 23, 2008 (KR) .................. 10-2008-0103986
Oct. 23, 2008 (KR) .................. 10-2008-0103988

(51) Int. Cl.
*G01B 9/02* (2006.01)
(52) U.S. Cl. ...................... 356/480; 356/477
(58) Field of Classification Search .............. 356/477; 359/337.22; 372/3
See application file for complete search history.

(56) References Cited

U.S. PATENT DOCUMENTS

2006/0187537 A1*  8/2006  Huber et al. ............. 359/337.22

FOREIGN PATENT DOCUMENTS

JP    2008-145375    6/2008
KR    10-2007-0074900 A    7/2007

OTHER PUBLICATIONS

D. Chen et al. "Multiple fiber Bragg grating interrogation based on a spectrum-limited Fourier domain mode-locking fiber laser", Optics Letters Jul. 1, 2008, vol. 33, No. 12.*

* cited by examiner

*Primary Examiner* — Gregory J Toatley
*Assistant Examiner* — Dominic J Bologna
(74) *Attorney, Agent, or Firm* — Sherr & Jiang, PLLC (57) ABSTRACT

Provided is an optical sensor interrogation system. The optical sensor interrogation system includes: a light source unit which matches round-trip time of light and wavelength tunable cycle time of light in a resonator and emits light; a sensing unit which receives an optical signal in which a center wavelength periodically tunes, from the light source unit and tunes the center wavelength of the optical signal according to physical changes applied from the outside; and a signal processing unit which receives the optical signal reflected from the sensing unit, detects data, and images the data. In particular, the light source unit includes a delaying unit which delays the round-trip time of light and a tunable filter which tunes the wavelength of light so as to match the round-trip time of light with the wavelength tunable cycle time of light. Accordingly, a Fourier domain mode locking (FDML) wavelength swept laser, which operates at speed of several tens kHz or above, is used as a light source so that strain of a fluid, which changes in a short time interval of 0.1 msec or below, is precisely measured and thus a real-time analysis may be performed at high speed.

17 Claims, 5 Drawing Sheets

OPTICAL SENSOR INTERROGATION SYSTEM BASED ON FDML WAVELENGTH SWEPT LASER

CROSS-REFERENCE TO RELATED PATENT APPLICATION

This application claims the benefit of Korean Patent Application No. 10-2008-0103986, filed on Oct. 23, 2008, and No. 10-2008-0103988, filed on Oct. 23, 2008, in the Korean Intellectual Property Office, the disclosures of which are herein incorporated in their entireties by reference.

BACKGROUND OF THE INVENTION

1. Field of the Invention

The present invention relates to an optical sensor interrogation system, and more particularly, to an optical sensor interrogation system which may monitor absolute values of physical quantities such as temperature, pressure, and strain in real-time at high speed by using a wavelength swept laser.

2. Description of the Related Art

In general, fiber Bragg grating (FBG) sensors irradiate ultraviolet rays to the core of optical fiber on which specific formed pattern (grating) is formed and induce a change of a refractive index. In this case, the FBG sensor selectively reflects light with a specific wavelength (Bragg wavelength) and a wavelength of light reflected by a pattern interval changes.

Accordingly, when a pattern interval changes due to external stress, a wavelength tune in reflected light may be observed and a change of the pattern interval, that is, strain, may be measured. In addition, the FBG sensor is not affected by an electromagnetic wave and the optical fiber including silica $SiO_2$ is an insulator. Also, the FBG sensor is small and light-weighted and thus may be installed and inserted without affecting functions of subjects to be measured. In addition, the FBG sensor may transmit optical signals to a distance without loss and thus facilitate telemetering. Moreover, a large number of FBG sensors may be installed at various places and used to measure at the same time so that multiplex measurement is available.

A method of realizing a general optical sensor interrogation system includes measuring a fiber grating wavelength by using a light source having broad line width and a wavelength tunable filter.

The other method of realizing a general optical sensor interrogation system includes using a wavelength swept laser as a light source. In this method, a wavelength tunable filter is used to tune a wavelength of the wavelength swept laser over a wavelength range of fiber gratings according to time, and the time of a peak in a fiber grating reflection signal is measured by using the specific relation between the time and the laser wavelength so that the wavelengths of the fiber gratings may be measured.

The general optical sensor interrogation system may be essential to liquefied natural gas (LNG) shipping which stores and transports LNG at a super low temperature. Since a tank storing LNG may be exploded even by a small crack, a real-time analysis which is performed at high speed for precisely measuring fluid flowing pressure and temperature is important.

In the optical sensor interrogation system according to the first method above, a peak of a reflected signal is low and the line width is great so that precise measurement is difficult.

For the real-time analysis which is performed at high speed for precisely measuring the strain of a fluid, wavelength tunable speed of 10 kHz or above is needed. In the optical sensor interrogation system using the wavelength swept laser according to the second method above, a peak of a reflected signal is high and the line width is narrow. However, regular optical gain acquisition response time in a resonator may not conform to an increase of wavelength tunable time. Thus, speed maintains few kHz or below.

SUMMARY OF THE INVENTION

The present invention provides an optical sensor interrogation system which operates at speed of several tens kHz or above by matching round-trip time of light with wavelength tunable cycle time in a resonator of a light source so that strain of a fluid may be precisely measured and a real-time analysis may be performed at high speed.

According to an aspect of the present invention, there is provided an optical sensor interrogation system including: a light source unit which matches round-trip time of light and wavelength tunable cycle time of light in a resonator and emits light; a sensing unit which receives an optical signal in which a center wavelength periodically tunes, from the light source unit and changes reflection according to the center wavelength of the optical signal based on physical changes applied from the outside; and a signal processing unit which receives the optical signal reflected from the sensing unit, detects data, and images the data.

The light source unit may include: an amplifier which provides optical gain in the resonator; a delaying unit which delays the round-trip time of light provided from the amplifier; a tunable filter which periodically scans a wavelength of light in the resonator and tunes the wavelength of light; and an output coupler which outputs and feeds back light having the tuned wavelength in a predetermined ratio and continuously oscillates light, in order to match the round-trip time of light with the wavelength tunable cycle time of light.

The amplifier included in the light source unit may include a semiconductor optical amplifier or an erbium-doped fiber amplifier.

The delaying unit may be a delayed optical fiber installed in the resonator with a predetermined length for delaying the round-trip time of light. Here, the length of the delayed optical fiber may be determined by the ratio of speed of light in a refractive index of a core of the delayed optical fiber to operating frequency of the tunable filter.

The delaying unit may include a delayed optical circuit or a delayed mirror optical system for delaying the round-trip time of light.

The light source unit may include: a pump laser which provides light having a predetermined wavelength in the resonator; a wavelength division multiplexing (WDM) coupler which couples the predetermined wavelength of light generated from the pump laser; a Raman gain delaying unit which delays the round-trip time of light which passes through the WDM coupler; a tunable filter which periodically scans a wavelength of light in the resonator and tunes the wavelength; and an output coupler which feeds back and outputs light, which passes through the Raman gain delaying unit and has the tuned wavelength, in a predetermined ratio and continuously oscillates light, in order to match the round-trip time of light with the wavelength tunable cycle time of light.

The Raman gain delaying unit may cause Raman scattering with respect to light that passes through the WDM coupler, provide a predetermined optical gain in the resonator, and delay the round-trip time of light.

The Raman gain delaying unit may be a delayed optical fiber installed in the resonator with a predetermined length for delaying the round-trip time of light. Here, the length of the delayed optical fiber may be determined by the ratio of speed of light in a refractive index of a core of the delayed optical fiber to operating frequency of the tunable filter.

The Raman gain delaying unit may include a delayed optical circuit for delaying the round-trip time of light.

When the resonator has a ring-shape, the light source unit may further include isolators which transmit light in the resonator in one direction. When the resonator has a linear cavity, the light source unit may further include mirrors at both ends of the resonator for reflecting light.

The light source unit may further include polarization controllers for oscillating a light pulse in the resonator in a single polarization state. The sensing unit may receive optical signals in which the center wavelengths periodically tunes, from the light source unit and change reflection according to the center wavelengths of the optical signals based on a partial reflection structure of various layers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The objectives, characteristics, and advantages of the present invention will be described more fully by the detailed description of embodiments of the present invention with reference to the accompanying drawings.

Hereinafter, an optical sensor interrogation system using a Fourier domain mode locking (FDML) wavelength swept laser according to embodiments of the present invention will be described more fully with reference to the accompanying drawings. The present invention may, however, be embodied in many different forms and should not be construed as being limited to the embodiments set forth herein; rather, these embodiments are provided so that this disclosure will be thorough and complete, and will fully convey the concept of the invention to those skilled in the art. It should be understood, however, that there is no intent to limit exemplary embodiments to the particular forms disclosed, but on the contrary, exemplary embodiments are to cover all modifications, equivalents, and alternatives falling within the scope of the invention.

Figure 1:
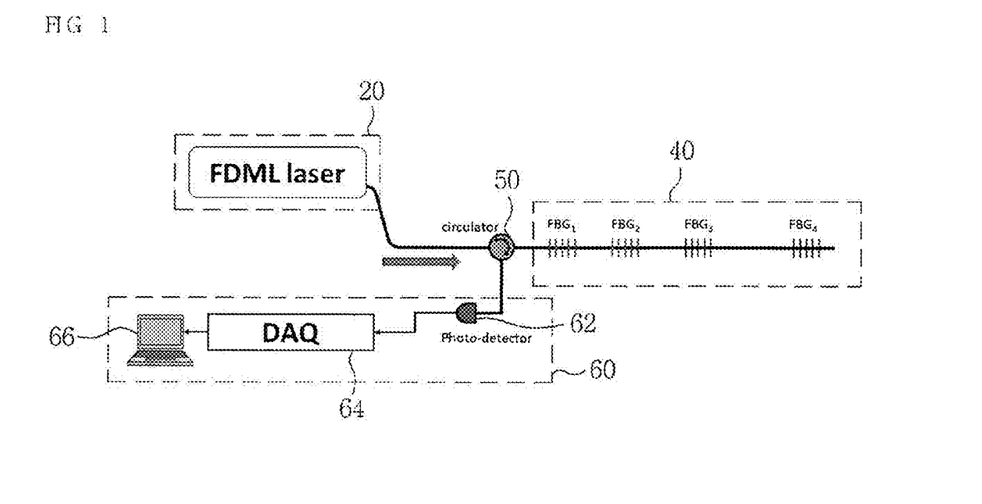
FIG. 1 is a conceptual view of an optical sensor interrogation system using a Fourier domain mode locking (FDML) wavelength swept laser, according to an embodiment of the present invention.

FIG. 1 is a conceptual view of an optical sensor interrogation system using a Fourier domain mode locking (FDML) wavelength swept laser, according to an embodiment of the present invention.

Referring to FIG. 1, the optical sensor interrogation system according to the current embodiment includes a light source unit 20, a sensing unit 40, and a signal processing unit 60, wherein the light source unit 20 discharges an optical signal, the sensing unit 40 receives the optical signal from the light source unit 20, tunes a center wavelength of the optical signal according to physical changes applied from the outside, and reflects the optical signal, and the signal processing unit 60 receives the optical signal reflected from the sensing unit 40, detects data, and images the data.

The light source unit 20 may include a FDML wavelength swept laser. The light source unit 20 will be described in more detail with reference to FIGS. 2A, 2B, 3A, and 3B.

Figure 2A:
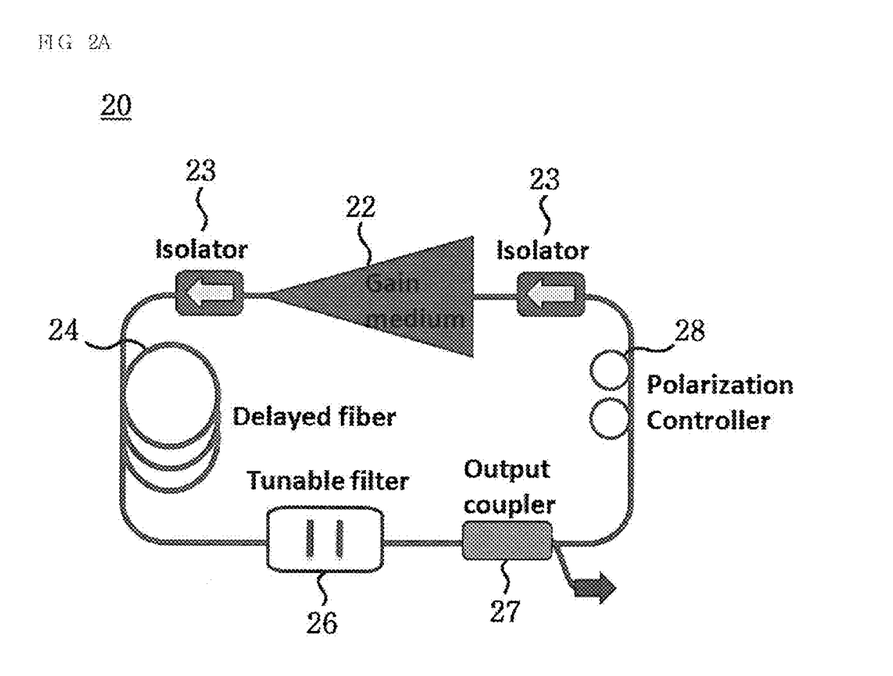
FIGS. 2A and 2B are conceptual views of a light source which provides a FDML wavelength swept laser, according to embodiments of the present invention.
Figure 2B:
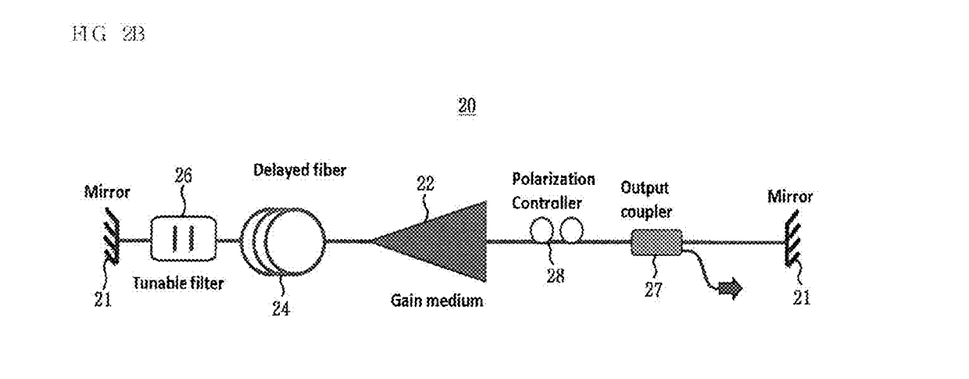

FIGS. 2A and 2B are conceptual views of the light source 20 which provides a FDML wavelength swept laser, according to embodiments of the present invention.

Referring to FIG. 2A, the light source unit 20 includes an amplifier 22, a delaying unit 24, a tunable filter 26, and an output coupler 27, wherein the amplifier 22 provides optical gain in a ring-shaped resonator, the delaying unit 24 delays round-trip time of laser light, the tunable filter 26 periodically scans a wavelength of laser light in the resonator and tunes the wavelength of light, and the output coupler 27 outputs and feeds back light having a tuned wavelength in a predetermined ratio so as to oscillate light.

According to the current embodiment, the amplifier 22 may be a semiconductor optical amplifier or an erbium-doped fiber amplifier. The semiconductor optical amplifier and the erbium-doped fiber amplifier are well known technologies and thus detailed description thereof is omitted.

A predetermined power source is supplied to the amplifier 22 by a power source supplier (not illustrated) and the power supplied to the amplifier 22 is determined according to internal loss of the resonator. That is, in order to compensate for internal loss occurring due to various elements in the resonator, the amplifier 22 may have to function as a gain medium. Accordingly, in order for the output coupler 27 to output light having sufficient light intensity, the power source supplied to the amplifier 22 from the power source supplier may be controlled.

Since the laser light intensity of the amplifier 22 is determined based on a level of the power source supplied from the power source supplier, electric power of the power source supplier is appropriately controlled so that the amplifier 22 has regular gain. That is, as the gain of the amplifier 22 is higher than the internal loss of the resonator, efficient laser light pulse heat may be obtained.

When predetermined pressure is applied to the amplifier 22, the amplifier 22 converts electric energy provided from the power source supplier into light energy and generates laser light.

The delaying unit 24 delays the round-trip time of laser light amplified by the amplifier 22. According to the current embodiment, the delaying unit 24 may include a delayed optical fiber, a delayed optical circuit, and a delayed mirror optical system.

The delayed optical fiber is installed in the resonator with a predetermined length for delaying the round-trip time of light. Here, the length of the delayed optical fiber may be determined by the ratio of speed of light in a refractive index of a core of the delayed optical fiber to operating frequency of the tunable filter 26. That is, the length of the delayed optical fiber is determined by a value obtained by dividing 'speed of light' by a value obtained by multiplying the core of the delayed optical fiber by operating frequency of the tunable filter 26'.

In addition, a delayed optical circuit may delay the round-trip time of light by using its internal circuit structure.

Moreover, the delayed mirror optical system may delay the round-trip time of light by using optical means such as a reflector or a retroreflector.

The delaying unit 24 is not limited to the delayed optical fiber, the delayed optical circuit, and the delayed mirror optical system and may include various means which may delay the round-trip time of light between an input terminal and an output terminal.

According to the current embodiment, the tunable filter 26 periodically scans a wavelength of light in the resonator and tunes the wavelength. For example, the tunable filter 26 includes a fiber fabry perot tunable filter (FFP-TF). Here, in the light incident onto the tunable filter 26, light having the same wavelength component with a resonance wavelength of the FFP-TF is discharged through a cavity and light having wavelength component that is not a resonance wavelength is reflected.

Due to this principle, light with a specific wavelength may be filtered and a resonance wavelength tunes by movement of a mirror so that a wavelength may be selectively filtered and only a desired wavelength may be selected. A permeation characteristic of the FFP-TF has very sharp Lorentzian form and a wavelength of an input optical signal may be easily identified due to the sharp permeation characteristic.

According to the current embodiment, the output coupler 27 outputs and feeds back light having a wavelength tuned by the tunable filter 26 in a predetermined ratio so as to oscillate light. That is, when amplifier 22 operates, the output coupler 27 continuously oscillates light within a short period of time. Here, the output coupler 27 functions as a laser reflector and outputs and feeds back light in a predetermined ratio so as to oscillate laser light.

Also, the output coupler 27 may oscillate a center wavelength of laser light in a desired region by the tunable filter 26 and thus the wavelength of laser light is stable.

Meanwhile, the light source unit 20 may further include isolators 23 installed at both sides of the amplifier 22. The isolators 23 are used to oscillate laser light in one direction without feedback in an opposite direction.

Also, the light source unit 20 may further include a polarization controller 28. The polarization controller 28 oscillates an optical pulse in the resonator in a single polarization state.

Accordingly, the delaying unit 24 is installed in the resonator so as to match the round-trip time of light with the wavelength tunable cycle time so that the a FDML wavelength swept laser may operate at wavelength tunable speed of several tens kHz or above. Thus, the optical sensor interrogation system may precisely measure strain of a fluid and analyze the fluid in real-time at high speed.

In order to suppress instability of a ring-shaped optical fiber laser, the optical fiber formed of the resonator may be fixed to a table so as to reduce instability of polarization occurring due to vibration.

The FDML wavelength swept laser described in the present invention is disclosed in Fourier Domain Mode Locking (FDML): A new laser operating regime and applications for optical coherence tomography, Vol. 14, No. 8, pp. 3225-3237 in OPTICS EXPRESS, a thesis in Optical Society of America and detailed description thereof may be referred to by the thesis.

Referring to FIG. 2B, the light source unit 20 according to another embodiment includes the amplifier 22, the delaying unit 24, the tunable filter 26, the output coupler 27, and the polarization controller 28, wherein the amplifier 22 provides optical gain in a linear cavity resonator which includes mirrors 21 at both ends, the delaying unit 24 delays the round-trip time of laser light, the tunable filter 26 periodically scans a wavelength of laser light in the resonator and tunes the wavelength of light, the output coupler 27 outputs and feeds back light having the tuned wavelength in a predetermined ratio so as to continuously oscillate light, and the polarization controller 28 oscillates a laser light pulse in a single polarization state.

The light source unit 20 illustrated in FIG. 2B is substantially the same as the light source unit 20 illustrated in FIG. 2A, except that the light source unit 20 of FIG. 2B includes the linear cavity resonator having the mirrors 21 at both ends for reflecting light. Accordingly, it would have been obvious to one of ordinary skill in the art to understand the light source unit 20 of FIG. 2B and thus the detailed description thereof is omitted.

Figure 3A:
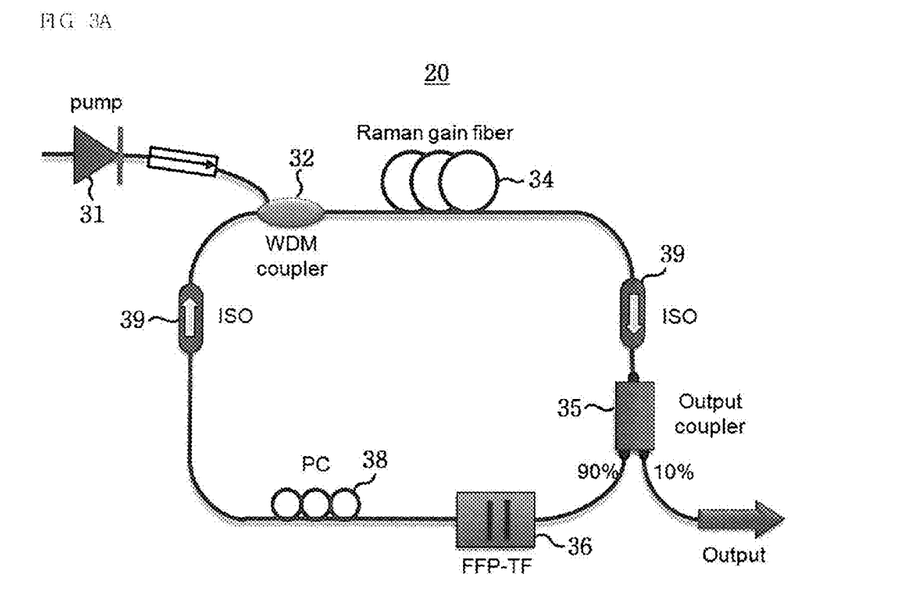
FIGS. 3A and 3B are conceptual views of a light source which provides a FDML wavelength swept laser, according to another embodiment of the present invention.
Figure 3B:
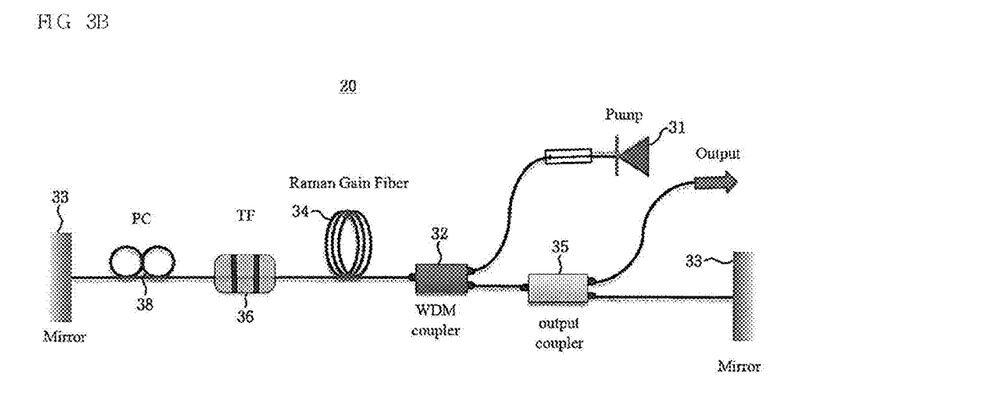

FIGS. 3A and 3B are conceptual views of the light source 20 which provides a FDML wavelength swept laser, according to another embodiment of the present invention. Some elements illustrated in FIGS. 3A and 3B are substantially the same as some elements illustrated in FIGS. 2A and 2B, and thus detailed description of the same elements is omitted.

Referring to FIG. 3A, the light source unit 20 according to the current embodiment includes a pump laser 31, a wavelength division multiplexing (WDM) coupler 32, a Raman gain delaying unit 34, a tunable filter 36, and an output coupler 35, wherein the pump laser 31 provides light having a predetermined wavelength in a ring-shaped resonator, the WDM coupler 32 couples the predetermined wavelength of light generated from the pump laser 31, the Raman gain delaying unit 34 delays the round-trip time of light which passes through the WDM coupler 32, the tunable filter 36 periodically scans a wavelength of light in the resonator and tunes the wavelength, and the output coupler 35 feeds back and outputs light, which has the tuned wavelength and passes through the Raman gain delaying unit 34, in a predetermined ratio.

The pump laser 31 provides light in the resonator. In the current embodiment, the pump laser 31 provides light having a wavelength of about 1450 nm in the ring-shaped resonator.

The WDM coupler 32 couples the wavelength of light generated from the pump laser 31. In the current embodiment, the WDM coupler 32 couples light provided from the pump laser 31 and the wavelength of light which is fed back into the resonator. That is, the WDM coupler 32 couples the wavelength of light which is firstly provided from the pump laser 31 and the wavelength of light which travels round in the resonator.

The Raman gain delaying unit 34 delays the round-trip time of light incident thereto through the WDM coupler 32. In the current embodiment, the Raman gain delaying unit 34 includes a delayed optical fiber and a delayed mirror optical system.

As described above, if the Raman gain delaying unit 34 is the delayed optical fiber, the delayed optical fiber is installed in the resonator with a predetermined length for delaying the round-trip time of light. Here, the length of the delayed optical fiber may be determined by the ratio of speed of light in a refractive index of a core of the delayed optical fiber to operating frequency of the tunable filter 36.

Also, the delayed mirror optical system may delay the round-trip time of light by using optical means such as a reflector or a retroreflector.

In the current embodiment, molecules of the Raman gain delaying unit 34 absorb light having a wavelength of about 1450 nm and thus energy increases. Then, increased energy falls down again and the Raman gain delaying unit 34 emits light having a wavelength of about 1550 nm. That is, when external light is incident onto the Raman gain delaying unit 34, molecules of the Raman gain delaying unit 34 absorb photon energy (hv) having a wavelength of 1450 nm and thus the energy increases. Then, the increased energy fall down again so that light having a shifted wavelength of 1550 nm is emitted, which is called as Raman scattering. The Raman scattering is a kind of non-linear phenomenon and is generated by an interaction between light and vibration of molecules of optical fiber.

Accordingly, the Raman gain delaying unit 34 functions as an amplifier which provides a predetermined optical gain in the resonator, in addition to the function of delaying the round-trip time of light.

As described above, the Raman gain delaying unit 34 causes Raman scattering with respect to light that passes through the WDM coupler 32, provides a predetermined optical gain in the resonator, and delays the round-trip time of light.

In the current embodiment, the tunable filter 36 periodically scans a wavelength of light in the resonator and tunes the wavelength. The tunable filter 36 is substantially the same as the tunable filter 26 of FIG. 2A and thus detailed description of the tunable filter 36 is omitted.

In the current embodiment, the output coupler 35 outputs and feeds back light having a wavelength tuned by the tunable filter 36 in a predetermined ratio and continuously oscillates light. For example, if the output coupler 35 is a 90:10 coupler, 90% of light which passes through the tunable filter 36 is fed back and remaining 10% of light is output to an output terminal. The fed back light source passes through the tunable filter 36 and is Raman scattered again in the Raman gain delaying unit 34 so that light having a wavelength of about 1550 nm is emitted. 90% of emitted light is fed back again by the output coupler 35 and remaining 10% of light is output to the output terminal. Since the above processes are repeated, a light source having high signal-to-noise ratio (SNR) is output to the output terminal.

In the current embodiment, the light source unit 20 further includes polarization controller 38 and isolators 39, wherein the polarization controller 38 oscillate a light pulse which passes through the tunable filter 36 in a single polarization state and the isolators 39 are disposed adjacent to the Raman gain delaying unit 34 and the polarization controller, respectively, and transmits light in the resonator in one direction.

Referring to FIG. 3B, the light source unit 20 includes the pump laser 31, the WDM coupler 32, the Raman gain delaying unit 34, the tunable filter 36, the output coupler 35, and the polarization controller 38, wherein the pump laser 31 provides light having a predetermined wavelength in a linear cavity resonator which includes mirrors 33 at both ends, the WDM coupler 32 couples the predetermined wavelength of light generated from the pump laser 31, the Raman gain delaying unit 34 delays the round-trip time of light which passes through the WDM coupler 32, the tunable filter 36 periodically scans a wavelength of light in the resonator and tunes the wavelength, the output coupler 35 feeds back and outputs light, which has the tuned wavelength and passes through the Raman gain delaying unit 34, in a predetermined ratio, and the polarization controller 38 oscillate a light pulse which passes through the tunable filter 36 in a single polarization state.

The light source unit 20 of FIG. 3B is substantially the same as the light source unit 20 of FIG. 3A, except that the light source unit 20 of FIG. 3B includes the linear cavity resonator having the mirrors 33 at both ends. Accordingly, it would have been obvious to one of ordinary skill in the art to understand the light source unit 20 of FIG. 3B and thus the detailed description thereof is omitted.

Referring back to FIG. 1, if optical signals in which light intensity changes in a regular slope according to a wavelength, are continuously emitted from the light source unit 20 in a predetermined time period, each of the sensors, for example, fiber Bragg grating (FBG) sensors, respectively reflect light having narrow spectrum line width. In this case, the FBG sensors respectively have different center wavelengths so that the optical signals reflected from the FBG sensors may have different center wavelengths. In addition, the center wavelengths and light intensity of the optical signals respectively reflected from the FBG sensors vary according to physical quantities applied from the outside.

In the current embodiment, the sensing unit 40 includes a plurality of FBG sensors and the FBG sensors are formed at predetermined intervals. The detailed description of the FBG sensors is provided in Description of the Related Art and thus further details thereof are omitted.

The sensing unit 40 receives the optical signals emitted from the light source unit 20 through a circulator 50, tunes the center wavelengths of the optical signals according to physical changes in temperature and strain applied from the outside, and reflects light. The FBG sensors having each different center wavelength are arranged in series at predetermined intervals in single optical fiber for appropriate time delay.

The sensing unit 40 receives optical signals in which the center wavelengths periodically tunes, from the light source unit 20, tunes the center wavelengths of the optical signals according to a partial reflection structure of various layers, and reflects light.

The signal processing unit 60 includes a photodetector 62, a detector 64, and a computer 66, wherein the photodetector 62 receives the optical signals reflected from the sensing unit 40 through the circulator 50 and converts the received optical signals into electric signals, the detector 64 detects signals converted by the photodetector 62, and the computer 66 calculates data detected by the detector 64 and images the data.

The photodetector 62 receives optical signals reflected by each of the FBG sensors and converts the received optical signals into electric signals.

In addition, the computer 66 stores the light intensity of the optical signals detected by the detector 64, compares the light intensity with previously input light intensity to obtain a difference, obtains an amount of tunes in wavelengths based on the difference, and calculates physical changes applied to each of the FBG sensors based on the amount of changes.

Here, if the first optical signal and the second optical signal are the same with each other, wavelength tunes may be obtained based on a difference between light intensity detected based on the first optical signal and stored and light intensity currently detected based on the second optical signal.

In addition, the wavelength tunes occurring due to physical changes applied from the outside are limited in the optical signals reflected from the each of the FBG sensors so that the computer 66 may identify which optical signals reflected from the FBG sensors the light intensity detected from the detector 64 corresponds. Accordingly, obtained values of the optical signals reflected from the specific FBG sensor are compared with previous values so as to obtain wavelength tunes.

Figure 4A:
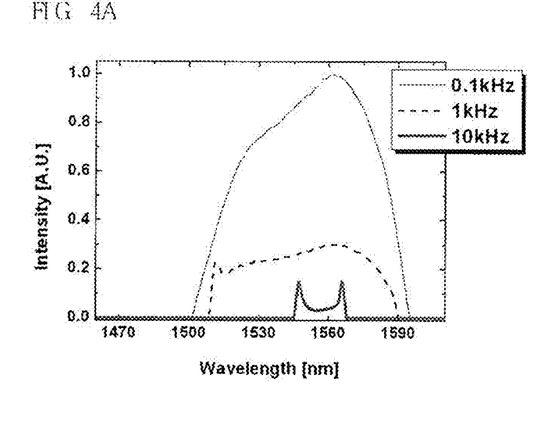
FIGS. 4A and 4B are graphs illustrating output spectrum of a FDML wavelength swept laser according to wavelength tunable speed, according to embodiments of the present invention.
Figure 4B:
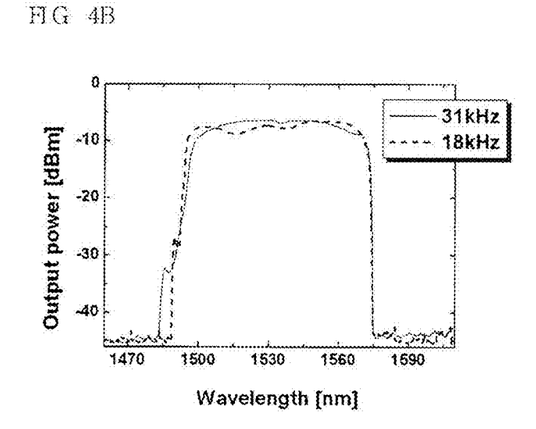

FIGS. 4A and 4B are graphs illustrating output spectrum of a FDML wavelength swept laser according to wavelength tunable speed according to embodiments of the present invention.

FIG. 4A is a graph illustrating output spectrum of the FDML wavelength swept laser according to wavelength tunable speed, in the prior art, when the delayed optical fiber 22 is not included in the light source unit 20 and the graph illustrates output spectrum when the FDML wavelength swept laser operates at wavelength tunable speed of 0.1 kHz, 1 kHz and 10 kHz.

Referring to FIG. 4, the output spectrum shows high distortion.

FIG. 4B is a graph illustrating output spectrum of the FDML wavelength swept laser according to wavelength tunable speed in the present invention when the delayed optical fiber 22 is included in the light source unit 20 and the graph illustrates output spectrum obtained when the length of the delayed optical fiber 22 included in the resonator is respectively set to 6.7 km and 11.5 km and the FDML wavelength swept laser operates at wavelength tunable speed of 31.3 kHz and 18 kHz.

Referring to FIG. 4B, distortion is hardly shown in the output spectrum.

Figure 5:
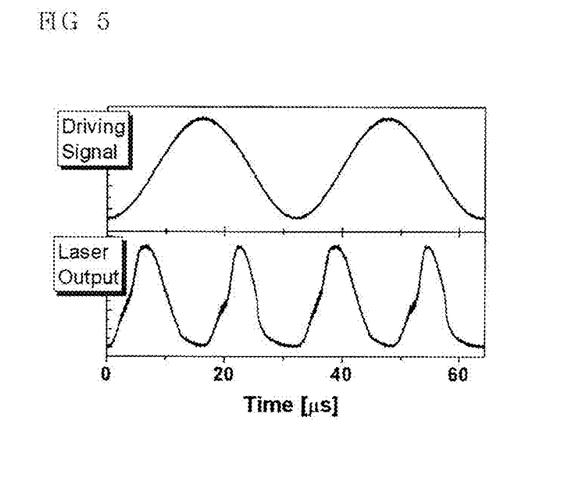
FIG. 5 is a graph illustrating output power values according to a wavelength applied to a FDML wavelength swept laser based on time, according to an embodiment of the present invention.

FIG. 5 is a graph illustrating output power values according to a wavelength applied to a FDML wavelength swept laser based on time, according to an embodiment of the present invention.

The graph of FIG. 5 illustrates output power values according to an applied wavelength based on the time when a tunable filter operates at speed of 31.3 kHz. Although the wavelength tunable speed increases, the same power level and response characteristics are shown in both forward scanning and backward scanning.

Figure 6A:
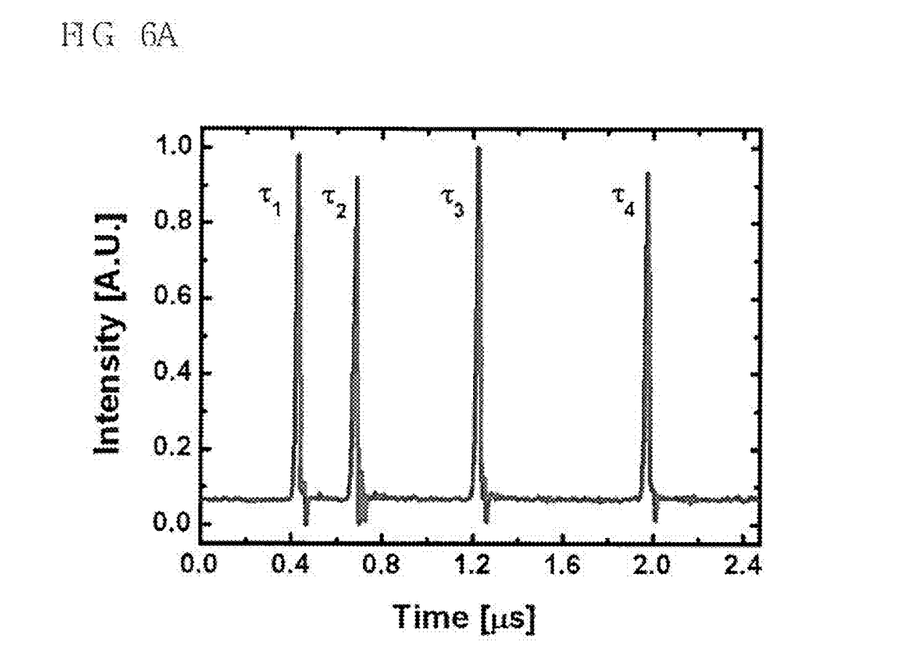
FIGS. 6A and 6B are graphs illustrating peaks of center wavelengths of an optical sensor respectively in a time region and a wavelength region, according to an embodiment of the present invention.
Figure 6B:
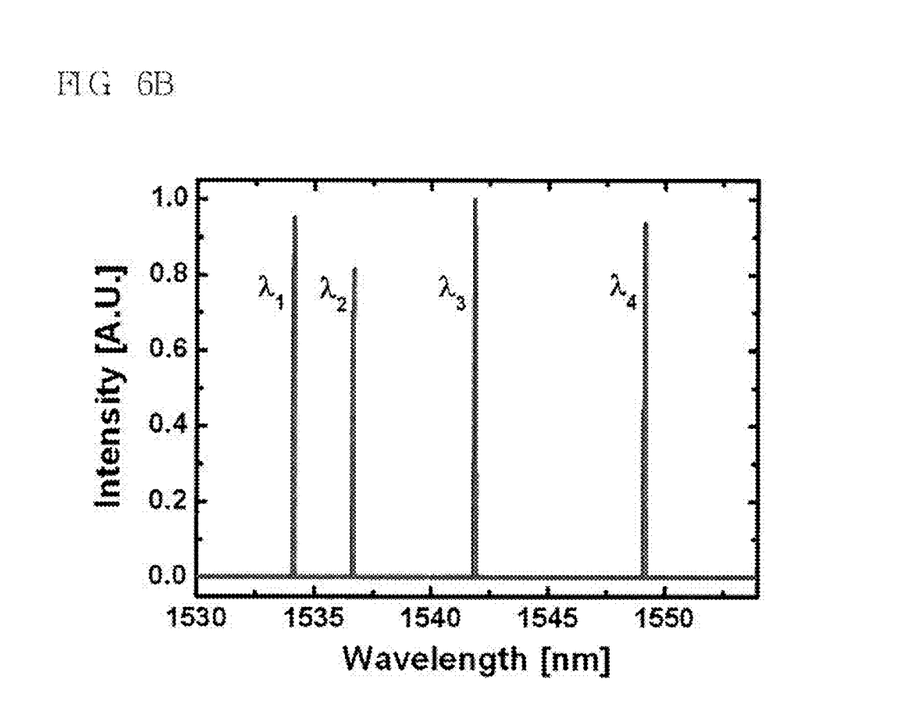

FIGS. 6A and 6B are graphs illustrating peaks of center wavelengths of an optical sensor respectively in a time region and a wavelength region, according to an embodiment of the present invention.

The graphs of FIGS. 6A and 6B illustrate peak locations of FBG sensors measured respectively in the time region and the wavelength region. In FIG. 6A, measured signals of the optical sensor interrogation system using the FDML wavelength swept laser according to the present invention are shown in the time region. FIG. 6B illustrates that measured signals of the optical sensor interrogation system using the FDML wavelength swept laser according to the present invention may be sensed in the same manner as in values measured by using an optical spectrum analyzer (OSA) in the wavelength region.

The optical sensor interrogation system using the FDML wavelength swept laser according to the present invention includes the delaying unit and the Raman gain delaying unit each having a predetermined length in the resonator of the light source unit so as to match the round-trip time of light with the wavelength tunable cycle time and thus the FDML wavelength swept laser, which operates at wavelength tunable speed of several tens kHz or above, is used as a light source. Thus, strain of a fluid which rapidly changes is precisely measured and thus a real-time analysis may be performed at high speed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical sensor interrogation system comprising:
a light source unit which matches a round-trip time of light with a wavelength tunable cycle time of light in a resonator and emits light;
a sensing unit which receives an optical signal, in which a center wavelength is periodically tuned, from the light source unit and changes reflection according to the center wavelength of the optical signal based on externally applied physical changes; and
a signal processing unit which receives the optical signal reflected from the sensing unit, detects data, and images the data,
wherein the light source unit comprises:
an amplifier which provides a predetermined optical gain in the resonator;
a delaying unit which is installed in the resonator and delays the round-trip time of light provided from the amplifier;
a tunable filter which periodically scans a wavelength of light in the resonator and tunes the wavelength of light; and
an output coupler which outputs and feeds back light having the tuned wavelength in a predetermined ratio and continuously oscillates light, wherein the delaying unit and the tunable filter are used to match the round-trip time of light with the wavelength tunable cycle time of light
wherein the length of the delaying unit is determined la the ratio of a speed of light in a core of the delaying unit with a predetermined refractive index to an operating frequency of the tunable filter.

2. The optical sensor interrogation system of claim 1, wherein the amplifier included in the light source unit is at least one of a semiconductor optical amplifier and an erbium-doped fiber amplifier.

3. The optical sensor interrogation system of claim 1, wherein the delaying unit is a delayed optical fiber.

4. The optical sensor interrogation system of claim 1, wherein the delaying unit is at least one of a delayed optical circuit and a delayed mirror optical system for delaying the round-trip time of light.

5. The optical sensor interrogation system of claim 1, wherein when the resonator has a ring-shape, the light source unit further comprises isolators which transmit light in the resonator in one direction.

6. The optical sensor interrogation system of claim 1, wherein when the resonator has a linear cavity, the light source unit further comprises mirrors at both ends of the resonator for reflecting light.

7. The optical sensor interrogation system of claim 1, wherein the light source unit further comprises a polarization controller for oscillating a light pulse in the resonator in a single polarization state.

8. The optical sensor interrogation system of claim 1, wherein the sensing unit receives optical signals, in which the center wavelengths is periodically tuned, from the light source unit and changes reflection according to the center wavelengths of the optical signals based on a partial reflection structure of various layers.

9. An optical sensor interrogation stem comprising:
a light source unit which matches a round-trip time of light with a wavelength tunable cycle time of light in a resonator and emits light;

a sensing unit which receives an optical signal, in which a center wavelength is periodically tuned, from the light source unit and changes reflection according to the center wavelength of the optical signal based on externally applied physical changes; and a signal processing unit which receives the optical signal reflected from the sensing unit, detects data, and images the data, wherein the light source unit comprises:

a pump laser which provides light having a predetermined wavelength in the resonator;

a wavelength division multiplexing coupler which couples the predetermined wavelength of light generated from the pump laser;

a Raman gain delaying unit which delays the round-trip time of light which passes through the wavelength division multiplexing coupler;

a tunable filter which periodically scans a wavelength of light in the resonator and tunes the wavelength; and an output coupler which feeds back and outputs light, which passes through the Raman gain delaying unit and has the tuned wavelength, in a predetermined ratio and continuously oscillates light, wherein the Raman gain delaying unit and the tunable filter are used to match the round-trip time of light with the wavelength tunable cycle time of light.

10. The optical sensor interrogation system of claim 9, wherein the Raman gain delaying unit causes Raman scattering of light that passes through the wavelength division multiplexing coupler, provides a predetermined optical gain in the resonator, and delays the round-trip time of light.

11. The optical sensor interrogation system of claim 9, wherein the Raman gain delaying unit is a delayed optical fiber installed in the resonator with a predetermined length for delaying the round-trip time of light.

12. The optical sensor interrogation system of claim 11, wherein the length of the delayed optical fiber is determined by the ratio of a speed of light in a core of the delayed optical fiber with a predetermined refractive index to an operating frequency of the tunable filter.

13. The optical sensor interrogation system of claim 9, wherein the Raman gain delaying unit is a delayed optical circuit for delaying the round-trip time of light.

14. The optical sensor interrogation system of claim 9, wherein when the resonator has a ring-shape, the light source unit further comprises isolators which transmit light in the resonator in one direction.

15. The optical sensor interrogation system of claim 9, wherein when the resonator has a linear cavity, the light source unit further comprises mirrors at both ends of the resonator for reflecting light.

16. The optical sensor interrogation system of claim 9, wherein the light source unit further comprises a polarization controller for oscillating a light pulse in the resonator in a single polarization state.

17. The optical sensor interrogation system of claim 9, wherein the sensing unit receives optical signals, in which the center wavelengths is periodically tuned, from the light source unit and changes reflection according to the center wavelengths of the optical signals based on a partial reflection structure of various layers.

* * * * *